United States Patent [19]

Mefferd

[11] Patent Number: 4,821,818
[45] Date of Patent: Apr. 18, 1989

[54] TUBE AUGER SECTIONS

[75] Inventor: Roy J. Mefferd, Laurens, Iowa

[73] Assignee: Micro Specialties Co., Inc., Laurens, Iowa

[21] Appl. No.: 151,025

[22] Filed: Feb. 1, 1988

[51] Int. Cl.$^4$ .............................................. E21B 17/22
[52] U.S. Cl. .................................... 175/323; 285/330; 285/913
[58] Field of Search ....................... 175/323, 320, 394; 285/913, 330, 419, 373, 365–367

[56] References Cited

U.S. PATENT DOCUMENTS

| | | | |
|---|---|---|---|
| 1,054,812 | 3/1913 | Zierath | 285/330 X |
| 2,195,492 | 4/1940 | McDonald | 285/330 |
| 3,190,377 | 6/1965 | Rassieur | 175/323 X |
| 3,206,936 | 9/1965 | Moor | 285/913 |
| 3,240,513 | 3/1966 | Turzillo | 175/323 X |
| 3,794,127 | 2/1974 | Davis | 175/323 X |
| 3,796,448 | 3/1974 | Rinshamp | 285/330 X |
| 3,967,837 | 7/1976 | Westerlund et al. | 285/365 X |

FOREIGN PATENT DOCUMENTS

| | | | |
|---|---|---|---|
| 45724 | 2/1982 | European Pat. Off. | 285/330 |
| 152860 | 10/1963 | U.S.S.R. | 175/323 |
| 924342 | 4/1982 | U.S.S.R. | 285/330 |
| 979612 | 12/1982 | U.S.S.R. | 285/330 |

Primary Examiner—Hoang C. Dang
Attorney, Agent, or Firm—Zarley, McKee, Thomte, Voorhees & Sease

[57] ABSTRACT

The present invention comprises first and second auger sections having upper and lower ends. The lower end of the first auger section is detachably secured to the upper end of the second auger section. The lower end of the first auger section includes a collar having axially extending indentations and projecting therein. The upper end of the second auger section includes a similar collar having axially extending projections and indentations therein. The two collars are matingly interlocked to prevent rotation of the augers sections with respect to one another. A detachable coupler surrounds the interlocked first and second collar means and holds them against axial movement away from one another. A seal causes the two ends to be sealed with respect to one another so that fluid cannot enter the internal bore of the tube sections. One modified form of the invention comprises using laser cut slots which extend axially in the tube of the auger section so as to permit fluid to enter the internal bore of the auger section.

13 Claims, 2 Drawing Sheets

U.S. Patent    Apr. 18, 1989    Sheet 1 of 2    4,821,818
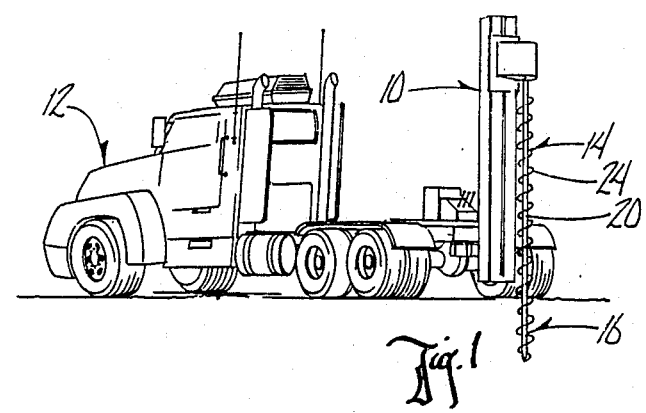
Fig. 1
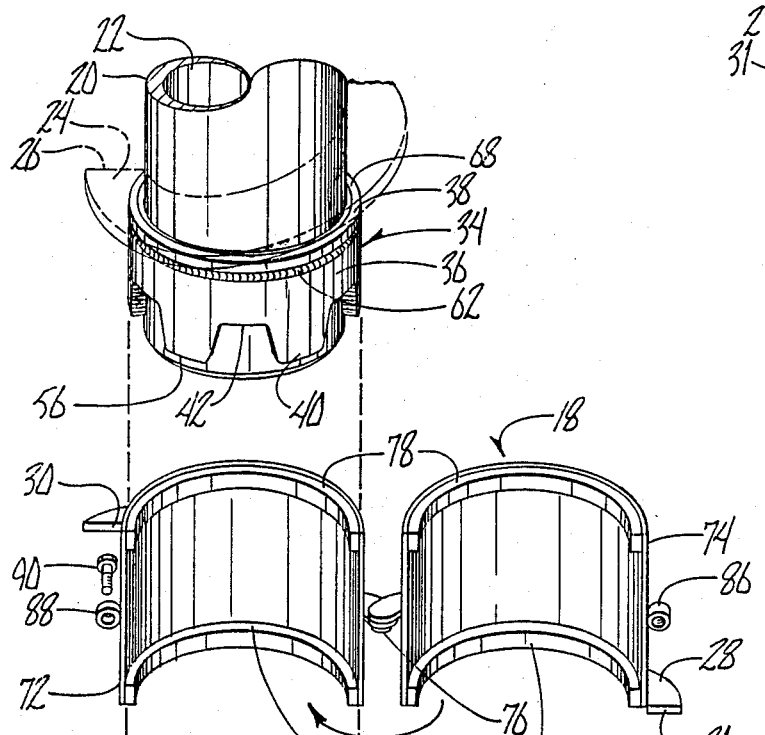
Fig. 2
Fig. 3

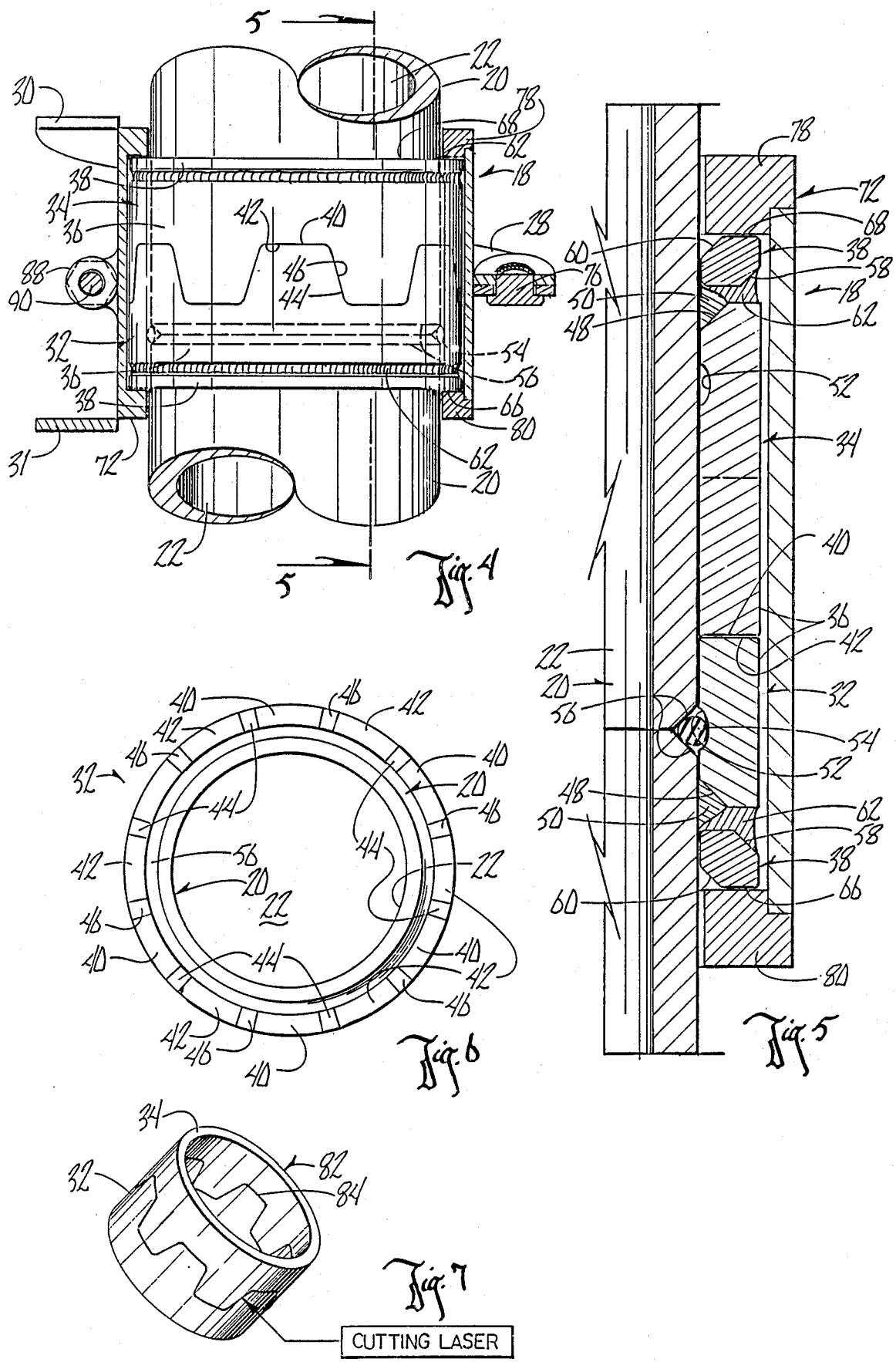

TUBE AUGER SECTIONS

BACKGROUND OF THE INVENTION

This invention relates to tube auger sections, and more particularly to tube auger sections which can be coupled easily together during a well drilling process.

In the drilling of wells, a first auger section is attached to the drilling rig and is drilled into the ground. Then, a second auger section is attached to the upper end of the first auger section and the drilling process is continued, with additional auger sections being added until the well is complete.

The connecting of the auger sections is a cumbersome process, which takes a substantial amount of time. Present methods for coupling these sections together involve using a plurality of bolts which bear both the axial and the torque loads between the two auger sections. The axial loads can become very substantial since each auger section is made of steel and is quite heavy. The weight of the auger sections in a 200 foot well is substantial, and places a severe stress on the bolts holding the various auger sections together.

Similarly, the torque applied to the auger sections during the drilling process is very great, and places severe torque on the couplings or bolts which are presently used to couple the auger sections together.

In recent years, the drilling of monitor wells has been increased. The purpose of a monitor well has been to monitor the ground water at a particular level to determine whether or not the water at that level has been exposed to pollution or contamination. Tube augers are used for drilling these monitor wells. However, it is important that the interior bore of the tube sections be sealed except at the desired depth for monitoring the ground water. If ground water at a higher level is permitted to seep into the tube, it destroys the reliability of the monitoring of the ground water at the desired monitoring level. Therefore, the tube sections must be sealed so as to prevent ground water from entering the interior bore of the tube auger.

Another problem encountered with tube augers is the ability to provide screens or access openings in the tube auger at the desired monitoring depth in the well. Presently this is done by cutting a rectangular window in the tube and providing a screen therein to screen out sand and other particles. However, the cutting of a rectangular opening in the tube auger reduces the strength of the tube, and sometimes results in the tube twisting or collapsing during the drilling process.

Therefore, a primary object of the present invention is the provision of improved tube auger sections which can be easily coupled together.

A further object of the present invention is the provision of an improved coupling for coupling the tube auger sections together.

A further object of the present invention is the provision of a coupling for tube augers which is at least as strong as the tube auger and which is preferably stronger.

A further object of the present invention is the provision of a coupling for tube auger sections which does not place axial loads on a plurality of bolts as in prior devices.

A further object of the present invention is the provision of a coupling means for auger sections which provides a continuation of the auger flighting on the exterior of the tube.

A further object of the present invention is the provision of a coupling for auger sections which utilizes only a single bolt, and which frees that single bolt from axial and torque loads.

A further object of the present invention is the provision of a coupling for auger tube sections which is hinged and which can quickly be applied to the tube auger sections to couple them together.

A further object of the present invention is the provision of tube auger sections having collars at their upper and lower ends, the collars containing axially extending indentations and projections which are adapted to mate together when the auger sections are placed together, and which provide a means for transferring torque from one auger section to the other.

A further object of the present invention is the provision of a coupling device for auger sections which will maintain the auger sections in a straighter line than previous coupling devices.

A further object of the present invention is the provision of an auger section having a plurality of elongated slots therein for permitting fluid to enter the auger section.

A further object of the present invention is the provision of an auger section having elongated slots therein which extend circumferentially and which minimize the weakening of the auger tube.

A further object of the present invention is the provision of a device which is economical to manufacture, durable in use and efficient in operation.

SUMMARY OF THE INVENTION

The present invention includes a plurality of auger sections which have cylindrical collars or crowns placed at their upper and lower ends. Each collar or crown includes axially extending projections and indentations which are adapted to mate and interlock with the corresponding indentations and projections of another tube auger section.

When the sections are placed together, the upper section is lowered onto the upper end of the lower section and the crowns are interlocked. These interlocking crowns cause transfer of torque from one auger section to the other.

To complete the connection of the two augers, a hinged coupling member is placed around the interlocking collars of the two sections. The coupling member is hinged and is movable about the hinged connection from an open position to a closed position wherein it surrounds the collars or crowns of the two auger sections. A single bolt is used to bolt the coupling member in its coupled position or closed position. The coupling member has interior shoulders which engage corresponding shoulders on the upper and lower ends of the interlocked collars so as to prevent the collars from pulling axially apart from one another. A flighting extends around the coupling member and abuts against the ends of the flighting of the two auger sections so as to provide a continuation of the flighting from the upper auger section to the lower auger section.

A sealing ring is provided within the collar of the auger sections so as to seal the auger sections and prevent moisture from entering the interior of the tubes of the two auger sections.

The above invention provides several advantageous results. The interlocking projections of the crowns cause a strong means for transferring torque from one auger section to another. The seal within the crowns is important because it prevents unwanted fluid from seeping into the interior of the tube sections. This is particularly important when drilling monitor wells.

The vertical load of the device is borne by the coupling member which engages the upper and lower ends of the crowns on the interlocking tube sections. This coupling member provides a strong connection between the two auger sections, and the strength of the coupling will exceed the strength of the tube itself within each auger section. Thus, the tube itself will be broken or distorted from the combined weight of the auger sections before the coupling members will fail.

The coupling of the present invention eliminates the carrying of weight on a plurality of bolts. The coupling member of the present invention utilizes only one bolt, and this bolt is not subjected to loads from either the weight of the augers or from the torque applied to the augers. In contrast, the bolts of prior coupling devices bore both the weight and the torque between the auger sections.

The butted flights on the coupling member provide additional aid in transferring the torque from the upper auger section to the lower auger section, and they also provide a continuous flight which was not possible on prior art devices.

It has been found that the coupling method of the present invention will keep the tube sections straighter than could be obtained with prior coupling methods.

Another feature of the present invention involves the use of elongated slots in some of the tube sections. These elongated slots are used to replace the screened windows which are cut in the tube sections in present devices. The use of elongated slots extending in a circumferential direction minimizes the interference with the strength of the tube section. In prior devices, the rectangular windows cut in the tube section severely weakened the tube section and sometimes resulted in failure of the tube section. The elongated slots of the present invention are cut by means of a laser beam so as to provide communication from the exterior of the tube to the interior of the tube. The slots are from 0.007 inches to 0.010 inches wide and are approximately 2½ to three inches long. They are cut in an auger section tube which is approximately 3/16ths of an inch thick.

BRIEF DESCRIPTION OF THE FIGURES OF THE DRAWINGS

FIG. 1 is a perspective view of a drilling rig utilizing the sections of the present invention.

FIG. 2 is an elevational view showing two auger sections coupled together.

FIG. 3 is an enlarged exploded view of the coupling device utilized for two auger sections.

FIG. 4 is a sectional view showing the coupling member in section and in place around the mated upper and lower ends of two auger sections.

FIG. 5 is a sectional view taken along line 5—5 of FIG. 4.

FIG. 6 is a top plan view of one of the collars or crowns of the present invention.

FIG. 7 is a perspective view showing the manner in which the collars or crowns of the present invention are formed by a cutting laser.

DETAILED DESCRIPTION OF THE PREFERRED EMBODIMENT

Referring to FIG. 1, a conventional drilling rig 10 is shown mounted on a vehicle 12. Drilling rig 10 is shown with two auger sections 14 and 16, coupled together and suspended from the drilling rig 10. Auger sections 14 and 16 are shown in enlarged detail in FIG. 2, and are shown to be coupled together by a coupling member 18.

Tube section 14 comprises an elongated hollow tube 20 having an elongated bore 22 extending longitudinally therethrough. An auger flighting 24 extends helically around the outer surface of tube 20 and terminates in a lower flighting end 26. Coupling member 18 includes a flighting section 28 having an upper end 30 which abuts against the lower flighting end 26 of flighting 24.

Mounted on the upper end of auger section 16 is a crown 32 and mounted on the lower end of auger section 14 is a lower crown 34 (FIG. 3). Crown 32 is comprised of a collar 36 and an annular ring 38. Collar 36 includes an axial end having a plurality of projections 40 and indentations 42. The projections 40 include side walls 44, 46 which are angled downwardly toward the indentations 42. Also, as can be seen in FIG. 6, the side walls 44, 46 of each projection 40 extend in a radial direction toward the approximate center of the tube 20.

The lower end of collar 32 includes a beveled portion 48 (FIG. 5) for receiving a weld 50 attaching collar 32 to the upper end of tube 20. An annular grooved 52 is provided in the interior of collar 32 and receives a circular elastomeric sealing ring 54.

The upper end of tube 20 includes a beveled edge 56 which is positioned adjacent annular groove 52 so as to abut against the sealing ring 54 as shown in FIG. 5.

Annular ring 38 is shown in cross-section in FIG. 5 and includes an outer bevel 58 and an interior bevel 60. A fill weld 62 fills the space between ring 38 and the lower end of collar 36. Welds 50, 62 provide solid securement of the ring 38 and the collar 36 to tube 20. Furthermore, the ring 38 provides a downwardly projecting shoulder 66 which extends in an approximate radial direction with respect to the longitudinal axis of tube 20 and which faces downwardly.

Lower crown 34 at the lower end of tube section 20 is identical to upper crown 32, and therefore corresponding parts are assigned corresponding numerals. Ring 38 of lower crown 34 provides an upwardly presented shoulder 68 corresponding to the downwardly presented shoulder 66 of crown 32.

One difference between the upper crown 32 and the lower crown 34 relates to the position of the crowns 32, 34 with respect to the ends of tube 20. As can be seen in FIG. 3, the upper crown 32 projects upwardly beyond the upper beveled edge 56 of tube 20. In contrast, the lower crown 34 is positioned so that the lower beveled edge 56 of tube 20 projects outwardly beyond the projections 40 of crown 34.

Lower tube section 16 is of the same construction as upper tube section 14, and therefore corresponding parts carry the same numerals in the drawings. One difference between the lower tube section 16 is the provision of a plurality of circumferentially extending slots 70 in tube 20. These slots are formed by laser cutting. They are from 0.007 inches to 0.010 inches in width and are approximately 2½ to three inches long. They extend from the outer surface of tube 20 to the interior bore 22 thereof. Their purpose is to permit fluid to enter into the interior bore 22 so as to take a sample of ground water at the desired level. Tube sections containing these slots 70 are used only at the desired level for monitoring or sampling fluid from the well. The majority of the sections used in drilling the well are identical to tube section 14 and do not contain the slots 70.

FIGS. 2, 3, 4, and 5 show the manner in which the tube sections 14, 16 are coupled together. The projections 40, 42 of the collar 36 on the lower end of tube section 14 are lowered until they interlock with and mate with the projections and indentations 40, 42 of the upper crown 32 on auger section 16. This interlocking relationship is shown in FIG. 4. The angles of the walls 44, 46 are chosen so that a slight camming action can be obtained in bringing the two tube sections together. However, the angle of walls 44, 46 is such that when severe torque is applied between the upper and lower tube sections 14, 16, the tendency of the interlocked crowns 34, 36 to cam away from one another is minimized. The fact that walls 44, 46 extend in a plane which is approximately radial with respect to the center of tube 20, further facilitates the interlocking of the two crowns 34, 36 so as to provide the improved alignment of the auger sections 14, 16.

Coupling member 18 includes two semi-cylindrical sections 72, 74 which are hinged together by means of a hinge pin 76 (FIG. 4) for pivotal movement about an axis from an open position such as shown in FIG. 3 to a closed position surrounding crowns 34, 36 as shown in FIG. 4. The interior of sections 72, 74 is provided with an upper annular flange 78 and a lower annular flange 80 which are adapted to abut against the upwardly presented shoulder 68 of crown 34 and the downwardly presented shoulder 66 of crown 36, respectively, as can be seen in FIGS. 4 and 5. Thus, it can be seen that the flanges 78, 80 carry the axial load on the coupling member 18 caused by the tendency of auger sections 14, 16 to pull axially apart.

The semi-circular sections 72, 74 of coupling member 18 are held together by means of a bolt 90 which extends through bolt receiving ears 86, 88.

As can be seen in FIGS. 4 and 5, the lower end of tube 20 of upper auger section 14 protrudes downwardly within crown 32 of lower auger section 16 and abuts against the upper end of tube 20 of lower auger section 16. As can be seen in FIG. 5, the abutting ends of tubes 20 are located adjacent the sealing ring 54 which is within groove 52. The beveled edges 56 of the two tubes 20 also engage sealing ring 54 so as to provide a water tight seal around the circumferences of the abutting ends of tubes 20. This prevents water from gaining access to the interior bore 22 of tube 20, thereby maintaining a water tight integrity for the entire bore 22 of the combined tube sections 14, 16.

Referring to FIG. 7, the method for forming crowns 32, 34 is shown. A cylindrical tube section 82 is cut into two identical pieces by a cutting laser which progresses along the undulating path designated by the line 84. Tube 82 is preferably made out of steel or other metal and the cutting laser provides an accurate cut not capable by other means. By cutting the member 32 into two identical pieces, it is possible insure that the projections and indentations formed by line 84 are identical within collars or crowns 32, 34. This insures that the crowns will mate together and interlock as shown on FIG. 4. Furthermore, this provides an efficient means for cutting the crowns 32, 34 since only one cutting step is provided. If the crowns 32, 34 were separately manufactured, there would be required twice as much cutting time or milling time to make the undulating indentations and projections.

The present invention provides a much improved combination of auger sections for use in drilling wells. The seal provided by elastomeric ring 54 and the beveled edges 56 of tubes 20 is important to the present invention because it helps retain the water tight integrity of the tube sections once they are combined. The clamping member 18 is held together by a single bolt, and can be quickly bolted in place. Furthermore, bolt 82 does not bear any of the torque or weight loads between the two auger sections 14, 16. The torque is borne by the interlocking projections and indentations 40, 42 and is also further enhanced by the abutting edges of the flightings at 26, 30 and at 27, 31, respectively. The flanges 78, 80 within the coupling member 18 abut against the shoulders 66, 68 of the rings 38 which form a part of the crowns 32, 34, respectively. The ability of the coupling member 18 to withstand weight exceeds the ability of the tube sections 20 themselves to withstand weight, and therefore the tube sections 20 will fail prior to the time that the coupling member 18 will fail in response to weight of the auger sections. Similarly, the torque between the auger sections 14, 16 is transferred by means of the interlocking projections 40, 42. While coupling member 18 is shown to have two hinged half-cylinders 72, 74, it is also possible to provide more hinged sections if desired.

Thus, it can be seen that the device accomplishes at least all of its stated objectives.

What is claimed is:

1. In combination:
   a first auger section having an upper end and a lower end, said lower end of said first auger section having a first collar means thereon including an annular upwardly facing shoulder and an annular end edge facing axially downward, said end edge of said first collar means having at least one indentation and at least on projection therein;
   a second auger section having an upper end adjacent said lower end of said first auger section, said upper end of said second auger section having a second collar means with an annular downwardly facing shoulder and an annular end edge facing axially upwardly, said end edge of said second collar means having at least one indentation and at least one projection matingly interlocked with said indentation and projection of said lower end of said first auger section so as to hold said first and second auger sections against rotation about a vertical axis with respect to one another;
   said lower end of said first auger section comprising a tube member having a lower end extending axially below said annular end edge of said first collar means and protruding axially within said second collar means;
   said upper end of said second auger section comprising a tube member having an upper end which is recessed axially below said annular end edge of said second collar means and which abuts said lower end of said tube member of said first auger section so as to form a continuous tube from said tube members of said first and second auger sections, said continuous tube having a longitudinal bore extending therethrough;

a detachable coupling member surrounding said interlocked first and second collar means and holding said first and second collar means against axial movement away from one another;

said coupling member having a downwardly facing flange engaging said upwardly facing shoulder of said first collar means and an upwardly facing flange engaging said downwardly facing shoulder of said second collar means for limiting axial movement of said interlocked first and second collar means away from one another.

2. A combination according to claim 1, wherein said coupling member comprises at least two coupling member sections hinged to one another for hinged movement from a coupled position surrounding said first and second collar means to an uncoupled position for removal away from said first and second collar means, bolt means for detachably holding said coupling member sections in said coupled position.

3. A combination according to claim 2 wherein said bolt means is free from bearing any axial load resulting from a force pulling said interlocked first and second collar means axially away from one another, said axial load being borne by said upwardly and downwardly facing flanges of said coupling member.

4. A combination according to claim 1 wherein said first and second collar means each comprise a collar member and an annular ring, a weld joint being formed between said collar member and said annular ring for attaching said collar member and said annular ring to one another and to said first and second auger sections respectively.

5. A combination according to claim 4 wherein said annular rings of said first and second collar means form said upwardly and downwardly facing annular shoulders of said first and second collar means respectively.

6. A combination according to claim 1 comprising sealing means within said second collar means and sealingly engaging said abutting upper and lower ends of said tube members of said first and second auger sections so as to provide a water tight seal which prevents water from entering said longitudinal bore of said continuous tube.

7. A combination according to claim 1 wherein said first auger section comprises first helical flighting terminating in a lower flighting end, said second auger section comprising a second helical flighting terminating in an upper flighting end spaced axially from said lower flighting end of said first auger section, said coupling member having a coupling flighting which extends between said spaced apart upper and lower flighting ends and provides a flighting continuation therebetween.

8. A combination according to claim 7 wherein said coupling flighting comprises an upper coupling flighting end abutting said lower flighting end of said first auger section and said coupling flighting having a lower coupling flighting end abutting said upper flighting end of said second auger section, whereby said coupling flighting will combine with said interlocking indentations and projections of said first and second auger sections to cause the transfer torque from said first auger section to said second auger section.

9. In combination:

an upper tube member and a lower tube member, each having upper and lower ends and being arranged in end to end relationship with said lower end of said upper tube member adjacent said upper end of said lower tube member;

a first collar attached to and surrounding said upper tube member adjacent said lower end thereof, said first collar having an upwardly presented shoulder and a downwardly presented end edge including at least one axially extending projection and at least one axial indentation therein;

a second collar attached to and surrounding said lower tube member adjacent said upper end thereof, said second collar having a downwardly presented shoulder and an upwardly presented end edge including at least one axially extending projection and at least one axial indentation matingly interlocked with said indentation and projection of said lower edge of said first collar so as to hold said upper tube member and said lower tube member against rotation with respect to one another about their respective longitudinal axis;

said upper tube member having a helical flighting attached to the outer surface thereof and terminating in a lower flighting end spaced upwardly from said lower end of said upper tube member;

said lower tube member having a helical flighting attached to the outer surface thereof and terminating in an upper end spaced downwardly from said upper end of said lower tube member;

a detachable coupling member surrounding said interlocked first and second collars and engaging said upwardly and downwardly presented shoulders thereof to hold said first and second collars against axial movement away from one another, said coupling member having a helical flighting attached thereto which extends between said lower end of said flighting on said upper tube member and said upper end of said flighting on said lower tube member.

10. A combination according to claim 9 wherein said coupling member comprises at least two coupling member sections hinged to one another for hinged movement from a coupled position surrounding said first and second collars to an uncoupled position for removal away from said first and second collars, bolt means for detachably holding said coupling member sections in said coupled position.

11. A combination according to claim 10 wherein said bolt means is free from bearing any axial load resulting from a force pulling said interlocked first and second collars axially away from one another.

12. A combination according to claim 9 wherein said lower end of said upper tube member protrudes downwardly below said downwardly presented end edge of said first collar, and protrudes within and is surrounded by said second collar, said upper end of said lower tube member being axially recessed downwardly from said upwardly presented end edge of said second collar.

13. A combination according to claim 12 wherein said second collar having an inner annular surface and an annular groove formed in said inner annular surface, an elastomeric sealing ring being seated in said groove and sealingly engaging said lower end of said upper tube member.

* * * * *